Patented May 6, 1947

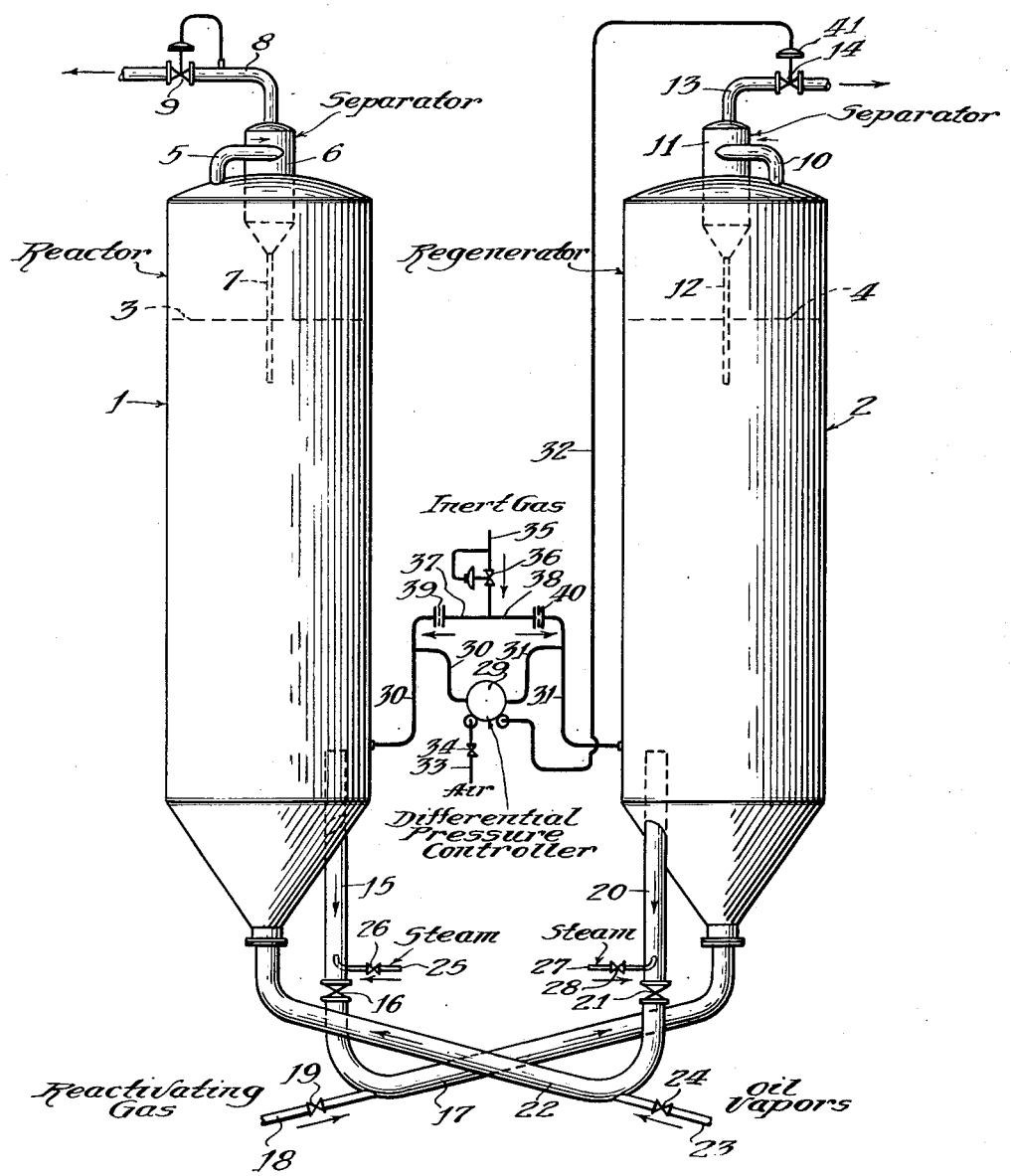

2,420,129

UNITED STATES PATENT OFFICE 2,420,129

CONTROLLING THE FLOW OF FLUIDIZED SOLIDS AND LIQUIDS

Bernard J. Flock and Clarence G. Gerhold, Chicago, Ill., assignors to Universal Oil Products Company, Chicago, Ill., a corporation of Delaware Application October 23, 1942, Serial No. 463,060

13 Claims. (Cl. 23—1)

The invention is directed to an improvement in systems of the type wherein streams of fluid are transferred between confined zones, the improvement being directed to a method and means of insuring a substantially uniform rate of flow for the transferred fluid from each of said confined zones to the other.

One of the best known systems in which the type of operation above mentioned is employed, is the so-called "fluid bed" type of catalytic cracking system and a description thereof will serve to illustrate the features and advantages of the invention. The subsequent description will, therefore, be directed principally to the construction and operation of a fluid bed type catalytic cracking system employing the features provided by the invention. However, this is not intended to limit the scope of the invention since its features may be advantageously applied to other processes and to other specific forms of apparatus wherein streams of fluid are transferred between confined zones.

The accompanying diagrammatic drawing is an elevational view of that portion of a fluid bed type catalytic cracking system pertinent to the present invention and employing its provisions. The advantageous features of the invention will be apparent from the drawing and the following description thereof.

Referring to the drawing, the apparatus here illustrated comprises an elongated substantially cylindrical reaction vessel 1 and an elongated substantially cylindrical regenerating vessel 2, each adapted to contain a fluidized bed of subdivided solid contact material such as cracking catalyst. The subdivided solid material comprising the bed in the reactor is maintained in turbulent fluid-like state resembling that of a boiling liquid by the passage of vaporous hydrocarbons to be cracked and resulting vaporous and gaseous conversion products upwardly through the vessel in contact with the catalyst particles, the net upward velocity of the vapors and gases being greater than that of the catalyst particles and resulting in the phenomenon known as "hindered settling" in the fluid bed. The fluidized bed of catalyst particles in the reactor comprises a relatively dense lower phase, containing a high concentration of catalyst particles, and a substantially less dense upper phase containing a lower concentration of catalyst particles. The approximate line of demarkation between the light and dense phases of the fluid bed in the reactor is indicated at 3.

The catalyst which promotes the cracking reaction in reactor 1 becomes contaminated by the deposition thereon of heavy combustible conversion products of a carbonaceous or hydrocarbonaceous nature and a stream of catalyst is continuously transferred from the dense phase of the fluid bed in the reactor to the regenerating vessel 2. In the regenerator deposited contaminants are burned from the catalyst particles in a stream of air or other oxygen-containing gas.

The bed of subdivided solid catalyst undergoing regeneration in vessel 2 is also maintained in turbulent fluid-like state resembling that of a boiling liquid by the passage of the regenerating gas stream and resulting combustion gases upwardly through this vessel in contact with the catalyst at a net upward velocity greater than that of the catalyst particles. Thus, hindered settling of the catalyst is also obtained in the regenerating vessel, the catalyst bed therein comprising a relatively dense lower phase and a substantially less dense upper phase, the approximate line of demarkation therebetween being indicated at 4 in the drawing.

Heat is absorbed by the catalyst during regeneration thereof in vessel 2 and a stream of hot regenerated catalyst is continuously transferred from the dense phase of the fluid bed thereof in regenerator 2 back to reactor 1, as will be later described, to maintain the desired degree of activity for the catalyst in the latter zone and to transfer heat from the exothermic regenerating operation taking place in vessel 2 to the endothermic cracking reaction taking place in vessel 1, thus supplying to the cracking reaction a substantial portion of the heat required for conducting the same.

Hydrocarbon vapors and gases resulting from the cracking reaction in vessel 1 are directed from the relatively light phase of the fluid bed thereof, together with entrained catalyst particles, through line 5 to suitable separating equipment, such as, for example, the cyclone type separator indicated at 6. Catalyst particles are separated from the vapors and gases in this zone and the separated catalyst is directed from the lower portion of the separator through standpipe 7 back into the dense phase of the fluid bed in the reactor. The hydrocarbon vapors and gases are directed from the upper portion of separator 6 through line 8 to suitable separating and recovery equipment not pertinent to the present invention and therefore not illustrated.

The operating pressure in the reaction vessel may be manually or automatically controlled in any suitable conventional manner such as, for example, by a valve regulating the rate of gas discharge from the distillate receiver of the system, not illustrated. For the sake of illustrating the control of operating pressure in the reactor without complicating the drawing by an illustration of the separating and recovery equipment, I have provided an automatic pressure-regulating valve 9 in line 8. This valve may be of any desired conventional type and, in the case illustrated, is a direct acting diaphragm valve in which the opening therethrough is enlarged by an increase in the pressure on its up-stream side and decreased by a decrease in the pressure on its up-stream side, thus maintaining substantially constant pressure in the reactor.

Gases resulting from regeneration of the catalyst in vessel 2 are directed, with entrained catalyst particles, from the relatively light upper phase of the fluid bed in this zone through line 10 to suitable separating equipment, such as, for example, the cyclone type separator 11, wherein catalyst particles are separated from the gases and returned through standpipe 12 to the dense phase of the fluid bed in the regenerator. Gases are directed from the upper portion of separator 11 through line 13, preferably to suitable heat recovery and other equipment, such as a scrubber or Cottrell precipitator for separating additional catalyst particles from the gases. This additional equipment is not pertinent to the present invention and is therefore not illustrated. A pressure control valve 14 is provided in line 13 to regulate the operating pressure in the regenerator and, in accordance with the features of the invention, this valve is operated in a special manner which will be later described. Valve 14 may, when desired, be disposed at any suitable subsequent point in the system, such as, for example, in the gas release line from the aforementioned heat recovery or additional separating equipment.

The stream of catalyst to be transferred from the reactor to the regenerator passes from a suitable point in the dense phase of the fluid bed in the latter zone through standpipe 15 and therefrom through a suitable restriction, such as an adjustable slide valve or orifice, indicated at 16, into transfer line 17. The catalyst particles commingle in line 17 with the reactivating gas being supplied to the regenerator and are transported, principally by its gas-lift action, to the lower portion of the regenerating vessel. The air or other reactivating gas employed is supplied to transfer line 17 at the desired rate and temperature through line 18 and valve 19.

In a similar manner the stream of catalyst to be transferred from the regenerator to the reactor passes from a suitable point in the dense phase of the fluid bed in the regenerator through standpipe 20 and thence through a suitable restriction such as the slide valve or adjustable orifice, indicated at 21, into transfer line 22. In line 22 the catalyst particles commingle with a preheated stream of hydrocarbons to be cracked, which are supplied preferably in preheated essentially vaporous state to transfer line 22 through line 23 and valve 24. The vapor flow through transfer line 22 into the lower portion of the reactor and transport the stream of regenerated catalyst particles, principally by their gas-lift action, through line 22 to the reactor.

Preferably, in order to substantially strip the column of catalyst particles passing through standpipe 15 of hydrocarbon vapors and gases and substantially strip the column of catalyst particles passing through standpipe 20 of combustion gases and air or oxygen-containing gas, small controlled quantities of steam or other suitable relatively inert gas are introduced into the standpipes at one or a plurality of points on the upstream side of the valves or orifices 16 and 21, to flow upward through the standpipes countercurrent to the descending catalyst particles. In the case illustrated, line 25, controlled by valve 26, is provided for introducing the stripping medium to standpipe 15, and line 27, controlled by valve 28, is provided for introducing the stripping medium to standpipe 20.

The reaction and regenerating vessels may be operated at substantially the same pressure or at different pressures and the transfer of catalyst, as above described, from the reactor to the regenerator and from the regenerator back to the reactor depends upon maintaining a lower hydrostatic pressure in the transfer lines 17 and 22 on the downstream side of valves or orifices 16 and 21, as compared with the hydrostatic pressure in the respective standpipes 15 and 20. This is obtained by the gas-lift action of the transporting oil vapors and regenerating gases in the transfer lines and by adjusting the valves or orifices 16 and 21 to obtain a drop in pressure therethrough from their upstream to their downstream sides.

It has previously been considered necessary in operations of this type to maintain a relatively high pressure drop through the restrictions at 16 and 21 and to accomplish this it has been necessary to elevate the vessels in order to maintain a relatively high hydrostatic head in the standpipes, or to provide a pit beneath the vessels to accommodate relatively high standpipes and the transfer lines. Elevation of the vessels or providing a pit beneath the vessels is costly and can be avoided by employing relatively low pressure drop through the valves or orifices 16 and 21.

A high pressure drop through the restrictions 16 and 21 is advantageous only in that it tends to damp out the effect of minor variations in the pressure on the upstream side of the restrictions. These minor variations are due principally to variations in the density of the fluid beds or changes in the level of the dense phase. Due to the transfer of catalyst between the reaction and regenerating zones, any minor change in one bed as compared with the other, tends to be cumulative and, if not promptly corrected, will upset the entire operation of the process. Intentional differences in operating pressure between the reaction and the regenerating zones can be compensated for by adjustment of the restrictions at 16 and 21, but variations from a constant relationship or constant differential between the hydrostatic pressure at the bottom of the fluid bed in the one vessel as compared with that of the bottom of the fluid bed in the other vessel will cause an increase in the flow of catalyst in one direction and a decreased flow of catalyst in the other direction, particularly when low pressure drop is employed through the restrictions 16 and 21.

The invention provides a method and means of overcoming the aforementioned difficulties and permits operation of the vessels at substantially the same or at different pressures, with relatively low pressure drop through the restrictions at 16 and 21, and which will maintain a substantially uniform rate of catalyst circulation between the vessels. This is accomplished by maintaining a substantially constant relation between the pressure existing in the vessels in the lower portion of the fluid beds and preferably at a point substantially corresponding to the points of removal of the catalyst streams therefrom.

The means by which the above stated objects of the invention are accomplished comprise, in the case illustrated, a differential pressure controller 29 which may be any one of the several well known forms of this type of instrument, utilizing either opposed bellows, interlinked Bourdon tubes, mercury manometers or the like. The pressure taps from the instrument 29 are connected through lines 30 and 31 with the respective vessels 1 and 2, preferably in the lower region of the dense phase of the fluid beds therein and, in the case illustrated, at an elevation substantially corresponding to the top of standpipes 15 and 20. It is possible to select other suitable points at which to measure pressures, such as, for example, in the standpipes immediately above the restricting points 16 and 21. The invention is therefore not limited to obtaining this measurement at any specific point but preferably the point selected is such that the pressure measured will reflect changes in the density and/or level of the catalyst bed. Instrument 29 functions to regulate the opening through the pressure control valve 14 in response to variations in the pressure transmitted to the instrument through line 30 from vessel 1, as compared with the pressure transmitted to the instrument through line 31 from vessel 2, so as to maintain substantially the same pressure at the control points in the two vessels or to maintain a substantially constant differential between the pressure in the one vessel and the pressure in the other vessel at the control points, the control points being, in the case illustrated, where lines 30 and 31 communicate with the fluid beds in the vessels.

In the case illustrated, the differential pressure controller 29 actuates valve 14 to change its setting by varying the air pressure in line 32, which connects the output side of the instrument with the diaphragm 41 of the valve. Air is supplied to the input side of the instrument through line 33 and valve 34 from any convenient source at a substantially constant pressure.

The operation of differential controllers of the type illustrated and of other specific forms is well known in the art, as is the operation of diaphragm and other types of pressure control valves. Therefore a more detailed description of their construction and operation is not considered necessary to an understanding of the invention, since the invention resides in the novel and advantageous application of such instrumentalities rather than in the instruments themselves.

In order to prevent catalyst particles from the fluid beds in vessels 1 and 2 from entering the controller 29, I provide for bleeding relatively small quantities of substantially inert gas, such as steam, for example, into lines 30 and 31 ahead of controller 29 at a sufficient rate to prevent the flow of catalyst into the instrument. The inert gas is supplied, in the case illustrated, through line 35 and valve 36 to branch lines 37 and 38, containing the respective orifices 39 and 40, into the respective lines 30 and 31. Valve 36 is an automatic pressure regulating valve which maintains a substantially constant upstream pressure on the orifices 39 and 40, this upstream pressure preferably being sufficiently higher than the downstream pressure encountered in either line 37 or line 38 that the flow through the orifices is not altered by changes in the downstream pressure.

It will be apparent that the invention herein provided is applicable to a wide variety of processes in which streams of any fluid, including either liquid or fluidized solid particles of subdivided solid catalyst or contact material, for example, is transferred between two or more confined zones. It is, therefore, not intended to limit the invention except as defined in the appended claims and the term "fluid" or "fluid material" as employed in the claims should be broadly interpreted to include either liquid or subdivided solid material in fluid state.

We claim as our invention:

1. In a process wherein non-gaseous material is circulated from a body thereof in a confined zone to a body thereof in a separate confined zone and back to the first named body and wherein a gaseous medium is passed through each of said zones, the improved method of maintaining a substantially uniform rate of circulation for said material between said zones which comprises regulating the gas outlet pressure in one of said zones in response to variations in differential between the pressures existing at a selected point in the body of material in each of said zones to maintain a substantially constant relationship between said pressures.

2. In a process wherein non-gaseous material is circulated from a body thereof in a confined zone to a body thereof in a separate confined zone and back to the first named body and wherein a gaseous medium is passed through each of said zones, the improved method of maintaining a substantially uniform rate of circulation for said material between said zones which comprises regulating the gas outlet pressure in one of said zones to maintain a substantially constant differential between the pressures existing in said zones at a selected point in the body of material in each of the zones.

3. In a process wherein non-gaseous material is circulated from a body thereof in a confined zone to a body thereof in a separate confined zone and back to the first named body and wherein a gaseous medium is passed through each of said zones, the improved method of maintaining a substantially uniform rate of circulation for said material between said zones which comprises measuring the differential pressure existing between said zones at selected points therein and controlling the pressure of the gaseous medium discharging from one of said zones in response to minor changes in said differential pressure whereby to maintain the latter substantially constant.

4. In a process wherein non-gaseous beds of material are maintained in separate confined zones and wherein a confined stream of said material is directed from the bed in each zone through a restriction and into the other zone and wherein a gaseous medium is passed through each of said zones, the improvement which comprises maintaining a substantially constant pressure drop through said restrictions, to maintain a substantially constant rate of circulation for said material between said zones, by measuring the pressure head of said material in each zone at a point adjacent and on the upstream side of said restriction and controlling the gas outlet pressure in one of said zones in response to variations in the pressures relative to each other prevailing in the separate zones at said points.

5. In a process wherein beds of non-gaseous material are maintained in separate confined zones and wherein a confined stream of said material is directed from the bed in each zone through a restriction and into the other zone and wherein a gaseous medium is passed through each of said zones, the improvement which comprises maintaining a substantially constant pressure drop through said restrictions, to maintain a substantially constant rate of circulation for said material between said zones, by measuring the pressure head of said material at a point in each zone adjacent and on the upstream side of said restrictions and controlling the gas outlet pressure in one of said zones in response to variations in the differential existing between said pressure heads in the separate zones.

6. In a process wherein beds of subdivided solid material are maintained in fluidized state in separate confined zones by the passage of gaseous media upwardly through said zones and wherein a confined stream of said material is directed from the bed in each zone through a restriction and into the other zone, the improvement which comprises maintaining a substantially constant pressure drop through said restrictions, to maintain a substantially constant rate of circulation for said material between said zones, by measuring the pressure head in each of said zones at a point adjacent and on the upstream side of said restrictions and controlling the gas outlet pressure in one of said zones in response to variations in the pressures relative to each other prevailing in the separate zones at said points.

7. In a process wherein fluidized beds of subdivided solid material are maintained in separate confined zones, a confined stream of the solid material being continuously removed from the bed thereof in each zone through a restriction and commingled on the downstream side of said restriction with a gaseous medium which effects transportation of the subdivided solid particles of said stream into the other zone, the method of maintaining a substantially constant pressure drop through each of said restrictions, to maintain a substantially uniform rate of circulation for said subdivided solid material between said zones, which comprises measuring the differential pressure existing between said zones at points adjacent and on the upstream side of said restrictions and controlling the gas outlet pressure in one of said zones in response to minor variations in said differential pressure.

8. An apparatus of the class described comprising, in combination, separate closed vessels, a transfer conduit connecting each of said vessels with the other vessel, a restriction being provided at a relatively low point in each of said transfer conduits, means for introducing a transporting fluid into each of said transfer conduits on the downstream side of said restriction therein, a discharge conduit communicating with the upper portion of each of said vessels, a pressure regulating valve in each of the last named conduits, and means for controlling one of said valves to maintain a substantially constant differential between the pressures existing in said vessels at a selected point in each of the vessels, the last-named means comprising a differential pressure controller communicating with each of the vessels at said selected point therein.

9. In a process wherein fluidized solid material is circulated from a body thereof in a first zone to a body thereof in a second zone and back to the first-mentioned body, and wherein a gaseous medium is passed through each of said zones in contact with the solid material therein, the method of maintaining a substantially uniform rate of circulation of fluidized solid material between said zones which comprises regulating the pressure of the gaseous medium discharging from one of said zones to maintain a substantially constant relationship between the pressures existing in said zones at a selected point in the body of solid material in each of said zones.

10. In a process wherein fluidized solid material is circulated from a body thereof in a first zone to a body thereof in a second zone and back to the first-mentioned body, and wherein a gaseous medium is passed through each of said zones in contact with the solid material therein, the method of maintaining a substantially uniform rate of circulation of fluidized solid material between said zones which comprises regulating the pressure of the gaseous medium discharging from one of said zones to maintain a substantially constant differential between the pressures existing in said zones at a selected point in the body of material in each of the zones.

11. An apparatus of the class described comprising a pair of closed vessels, a gas inlet at the lower portion and a gas outlet at the upper portion of each of said vessels, a pressure regulating valve for each of said outlets, a transfer conduit connecting each of said vessels with the other vessel, and means for controlling one of said valves to maintain a substantially constant relationship between the pressures existing in said vessels at a selected point in each of the vessels intermediate the gas inlet and outlet thereof, the last-named means comprising a differential pressure controller communicating with each of the vessels at said sciected point therein.

12. An apparatus of the class described comprising a pair of closed vessels, a gas inlet at the lower portion and a gas outlet at the upper portion of each of said vessels, a pressure regulating valve for each of said outlets, a transfer conduit connecting each of said vessels, at an intermediate point in the height thereof, with the other vessel, and means for controlling one of said valves to maintain a substantially constant differential between the pressures existing in said vessels adjacent said intermediate point of each of the vessels, the last-named means comprising a differential pressure controller communicating with each of the vessels at said intermediate point therein.

13. An apparatus of the class described comprising a pair of vertically elongated closed vessels, a transfer conduit connecting each of said vessels, at an intermediate point in the height thereof, with the lower portion of the other vessel, a restricton in each of said conduits, means for introducing fluid to each of said conduits, a discharge conduit connected to the upper portion of each of said vessels, a pressure regulating valve in each of said discharge conduits, and means for controlling one of said valves to maintain a substantially constant differential between the pressures existing in said vessels, the last-named means comprising a differential pressure controller communicating with each of the vessels adjacent said intermediate point thereof.

BERNARD J. FLOCK.
CLARENCE G. GERHOLD.

REFERENCES CITED

The following references are of record in the file of this patent:

UNITED STATES PATENTS

| Number | Name | Date |
|---|---|---|
| 2,387,309 | Sweeney | Oct. 23, 1945 |